United States Patent
Chatterjee et al.

(10) Patent No.: US 7,596,539 B2
(45) Date of Patent: Sep. 29, 2009

(54) METHOD AND APPARATUS FOR PROVIDING CONNECTION INFORMATION OF FUNCTIONAL COMPONENTS WITHIN A COMPUTER SYSTEM

(75) Inventors: Anirban Chatterjee, Austin, TX (US); Astrid Christiane Kreissig, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 10/448,270

(22) Filed: May 29, 2003

(65) Prior Publication Data

US 2005/0086637 A1 Apr. 21, 2005

(51) Int. Cl.
 *G06N 5/02* (2006.01)
(52) U.S. Cl. .............................. 706/47; 703/17; 717/105
(58) Field of Classification Search ................... 706/47; 716/1; 703/17, 21; 701/48
 See application file for complete search history.

(56) References Cited

U.S. PATENT DOCUMENTS

| 5,903,559 A | 5/1999 | Acharya et al. |
| 6,226,644 B1 | 5/2001 | Ciscon et al. |
| 2002/0107954 A1* | 8/2002 | Ferguson et al. ............. 709/224 |
| 2004/0177158 A1* | 9/2004 | Bauch et al. ................. 709/245 |
| 2006/0117274 A1* | 6/2006 | Tseng et al. .................... 716/1 |

FOREIGN PATENT DOCUMENTS

WO WO97/09800 3/1997

\* cited by examiner

*Primary Examiner*—David R Vincent
*Assistant Examiner*—Kalpana Bharadwaj
(74) *Attorney, Agent, or Firm*—Dillon & Yudell LLP

(57) ABSTRACT

A method and apparatus for determining connections among functional components within a computer system are disclosed. A rule table for describing all interconnections among the components within a computer system is initially constructed. The rule table includes a source functional unit column and a destination functional unit column. A row within the rule table is interrogated to determine if the computer system contains an actual source functional component and an actual destination functional component, according to the respective entries stored within the row. In response to the computer system contains an actual source functional component and an actual destination functional component, a source functional component object is logically connected to a destination functional component object within a hardware object table. The source functional component object corresponds to the actual source functional component, and the destination functional component object corresponds to the actual destination functional component.

12 Claims, 2 Drawing Sheets

| SOURCE 21 | DESTINATION 22 |
|---|---|
| Proc0 | L2_0; L2_1; MemCtlr0; IOHub0 |
| Proc1 | L2_2; L2_3; MemCtlr1; IOHub1 |
| MemCtlr0 | L3_0; L3_1; MemBuf0; MemBuf1 |
| MemCtlr1 | L3_2; L3_3; MemBuf2; MemBuf3 |

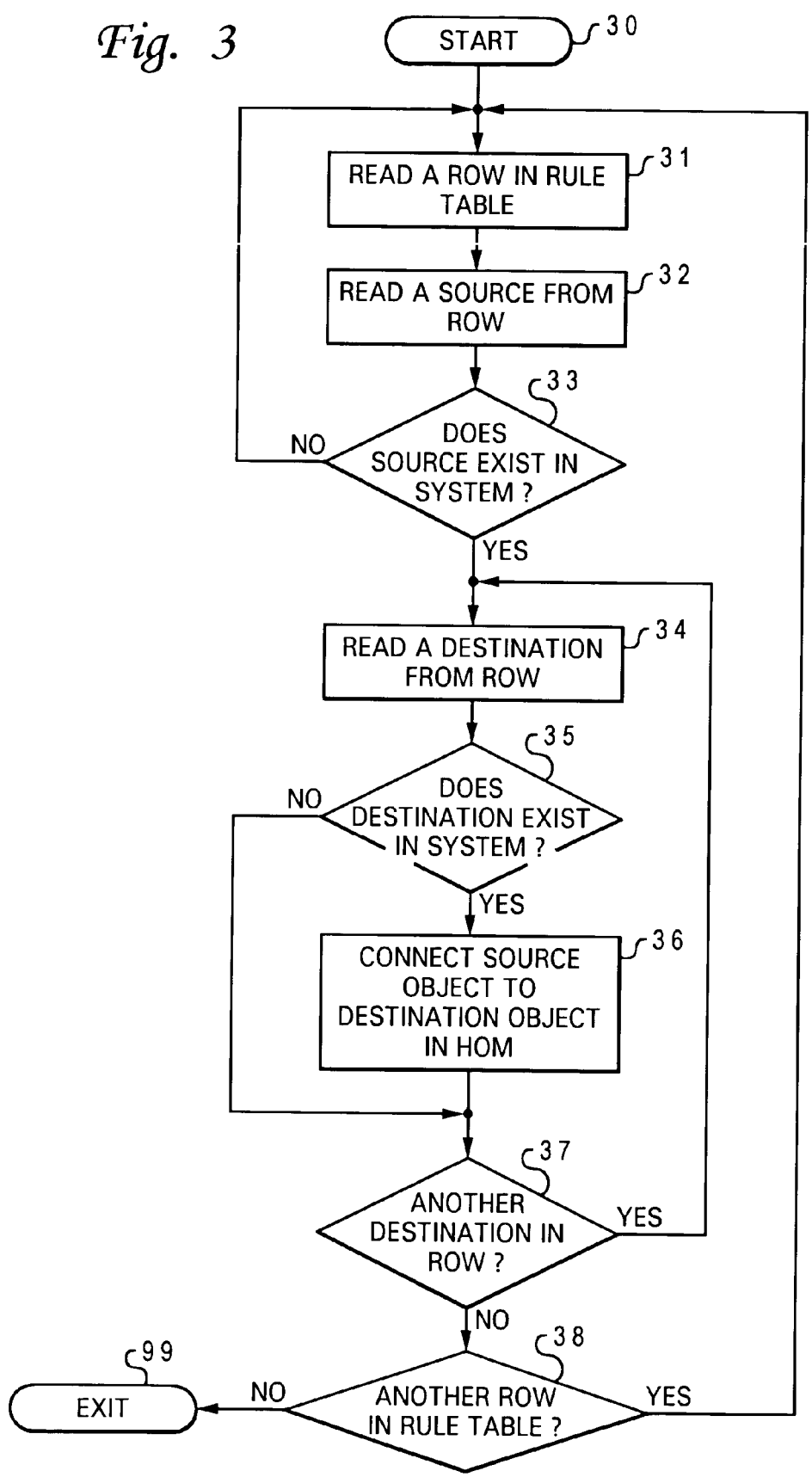

METHOD AND APPARATUS FOR PROVIDING CONNECTION INFORMATION OF FUNCTIONAL COMPONENTS WITHIN A COMPUTER SYSTEM

BACKGROUND OF THE INVENTION

1. Technical Field

The present invention relates to computer systems in general, and in particular to functional units within computer systems. Still more particularly, the present invention provides a method for providing connection information of functional components within a computer system.

2. Description of the Related Art

Today's computers are much more complex than those from just a few years ago. In order to keep track of the current state of a computer system, administrative software that is responsible for maintaining the operations of the computer system often keeps a hardware object model of the system hardware in a system memory. Such a hardware object model, which is typically generated during system startup, contains representations of a motherboard, various chips on the motherboard, on-chip functional units, and other active components.

Since different computer systems running identical software may have different configurations, a hardware object model has to be custom built according to the configuration of each computer system. Once the appropriate hardware objects have been defined in the hardware object model, the hardware objects need to be interconnected in much the same way the actual hardware is. Typically, the interconnections are hard-coded within a software image and are generated conditionally, depending on what boards the system software has found within a computer system. The problem with such an approach is that large tables of connections are needed by the startup code because a family of computer system can have multiple boards, but many of which may not even be needed in a particular computer system. Also, if the manufacturer of a computer system needs to alter the way in which a connection is made, a brand new software image must be provided to customers by the manufacturer.

Consequently, it would be desirable to provide an improved method and apparatus for providing connection information of functional components within a computer system for the purpose of building a hardware object model for the computer system.

SUMMARY OF THE INVENTION

In accordance with a preferred embodiment of the present invention, a rule table for describing all interconnections among the components within a computer system is constructed. The rule table includes a source functional unit column and a destination functional unit column. A row within the rule table is interrogated to determine if the computer system contains an actual source functional component and an actual destination functional component, according to the respective entries stored within the row. In response to the computer system contains an actual source functional component and an actual destination functional component, a source functional component object is logically connected to a destination functional component object within a hardware object table. The source functional component object corresponds to the actual source functional component, and the destination functional component object corresponds to the actual destination functional component. In addition, a source functional component within the source functional unit column may be simultaneously connected to multiple destination functional components within the destination functional unit column.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a high-level logic flow diagram of a method for using the connection information within the rule table from FIG. 2, in accordance with the preferred embodiment of the present invention.

DETAILED DESCRIPTION OF A PREFERRED EMBODIMENT

Figures 1, 2:
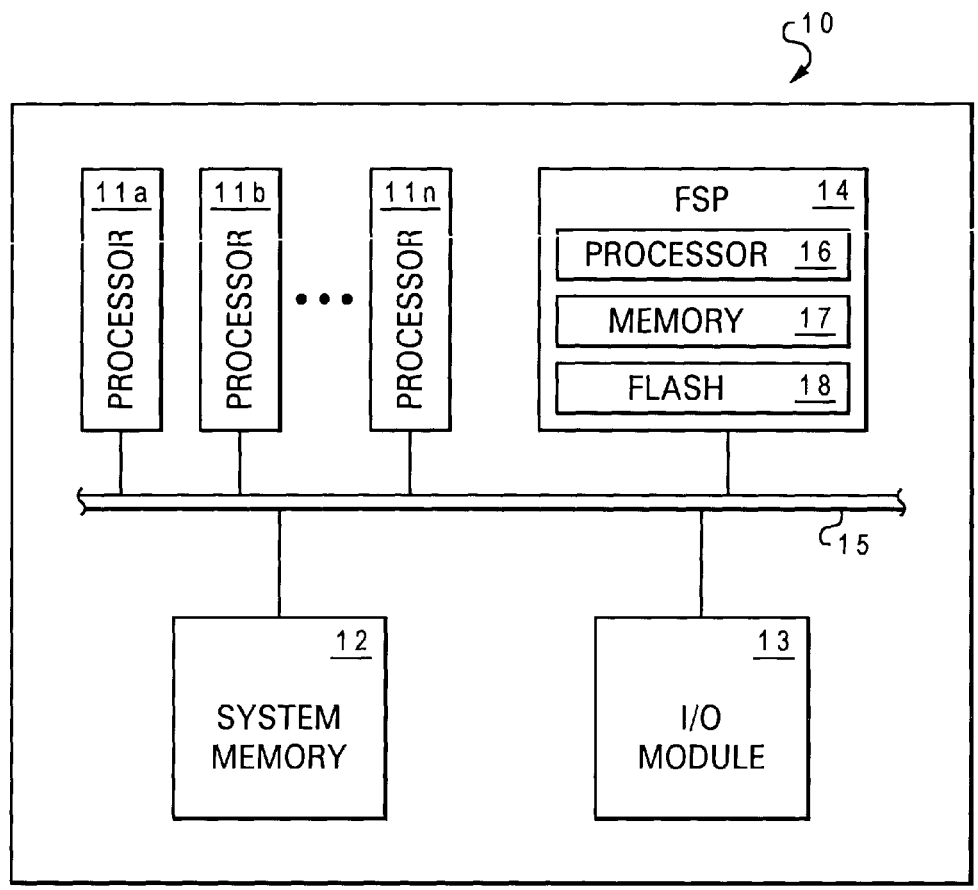
FIG. 1 is a block diagram of a multiprocessor computer system in which a preferred embodiment of the present invention is incorporated.
FIG. 2 is a block diagram of a rule table, in accordance with a preferred embodiment of the present invention.

Referring now to the drawings and in particular to FIG. 1, there is illustrated a block diagram of a multiprocessor computer system in which a preferred embodiment of the present invention is incorporated. As shown, a multiprocessor computer system 10 includes processors 11$a$-11$n$, a system memory 12, an input/output (I/O) module 13 and a flexible service processor (FSP) board 14. Processors 11$a$-11$n$, system memory 12, I/O module 13 and FSP board 14 are interconnected to each other via a system bus 15. It is understood by those skilled in the art that multiprocessor computer system 10 may include other functional components that are not shown in FIG. 1.

FSP board 14 further includes a processor 16, a volatile storage device such as a random access memory module 17 and a non-volatile storage device such as a FLASH memory device 18. A separate file system and an operating system are stored within FLASH memory device 18. In essence, FSP board 14 is in itself a computer system of its own for serving multiprocessor computer system 10.

In the prior art, the interconnections of the components within multiprocessor computer system 10 are typically hard-coded into a software image stored within FLASH memory device 18. During startup of multiprocessor computer system 10, the software image stored within FLASH memory device 18 is loaded into random access memory module 17 for further access.

In accordance with a preferred embodiment of the present invention, a rule table is utilized to describe all the interconnections among the components within a computer system such as multiprocessor computer system 10. Preferably, the rule table is stored in a non-volatile storage device such as FLASH memory device 18 of multiprocessor computer system 10. Each row of the rule table describes interconnections from one source functional component to at least one destination function component.

Reference now to FIG. 2, there is depicted a block diagram of a rule table, in accordance with a preferred embodiment of the present invention. As shown, a rule table 20 includes a source functional unit column 21 and a destination functional unit column 22. Source functional unit column 21 provides a list of components within a computer system. For example, as shown in FIG. 2, source functional unit column 21 includes a processor 0, a processor 1, a memory controller 0 and a memory controller 1. Each row of destination functional unit column 22 contains a list of components to which the component in the corresponding row of source functional unit column 21 can be connected. For example, as shown in FIG. 2, processor 0 is connected to two level-two cache memories (L2_0 and L2_1), a memory controller (MemCtlr0) and an I/O hub module (IOHub0); processor 1 is connected to two level-two cache memories (L2_2 and L2_3), a memory controller (MemCtlr1) and an I/O hub module (IOHub1); memory controller 0 is connected to two level-three cache memories (L3_0 and L3_1) and two memory buffers (MemBuf0 and MemBuf1); and memory controller 1 is connected to two level-three cache memories (L3_2 and L3_3) and two memory buffers (MemBuf2 and Membuf3).

During startup of a computer system, the device-level software of the computer system initiates the process of generating a hardware object model. Then, the computer system ensures that a rule table, such as rule table 20, being loaded corresponds to the computer system type being initialized. After all the functional component objects have been generated in the hardware object model (with each functional component object corresponding directly to an actual functional component installed within the computer system), the device-level software interrogates rule table 20 in order to generate the required interconnections for all the components listed within the hardware object model. The device-level software then interconnects all the hardware objects described within the hardware object model accordingly.

Specifically, the device-level software first checks to make sure that a hardware object, which represents a current source functional component, exists in a row of source functional unit column 21 within rule table 20. Then, the device-level software iterates through a list of destination functional components in the same row of destination functional unit column 22 within rule table 20. For each destination functional component that also exists in the row within rule table 20, a corresponding logical connection is made in the hardware object model, provided that the component exists in the computer system. The device-level software iterates through all the rows within rule table 20 in the above-described manner. In the present implementation, each connection made within the hardware object model is preferably bi-directional; however, directional connections can also be made.

In an alternative embodiment of rule table 20, the presence of a source functional component can be maintained at the start of a rule table entry, but the rule table would have predefined columns having specific meanings. For example, if a particular processor is connected to a memory controller, the device-level software will find the processor, then navigate out to the appropriate memory controller column to determine which memory controller the processor is connected to. One advantage to the alternative embodiment is that pass through functional component connections can be supported. For example, a computer system may have a board layout where processors A, B, C and D are connected in a ring configuration, and if processor B is not installed, processor A passes through processor B and connects directly to processor C. So the device-level software looks up processor A in the rule table and goes out to the connector processor column to find processor B. Since processor B does not exist in the computer system, the device-level software then finds processor B as a source in the rule table and retrieves the processor to which processor B is connected, and, in the present example, it is processor C. Assuming processor C exists, a connection is then made between processor A and processor C.

Basically, rule table 20 describes all the possible connections of the functional components within a particular computer system, such as multiprocessor computer system 10 from FIG. 1. Although rule table 20 is tailored to a specific computer system, rule table 20 can be changed dynamically. If there is a hardware upgrade on the computer system to a level that calls for different connections for functional components, all a user has to do is to load a new rule table that is similar to rule table 20 with new interconnections among various components (instead of recompilation in order to generate a new hard-code interconnection information for the new interconnections).

Referring now to FIG. 3, there is depicted a high-level logic flow diagram of a method for using the connection information within a rule table, such as rule table 20 from FIG. 2, by device-level software for the generation of a hardware object model, in accordance with a preferred embodiment of the present invention. Starting at block 30, a row in the rule table is read as shown in block 31. A source functional component is read from a source functional unit column of the row, as depicted in block 32. A determination is made as to whether or not the corresponding source functional component actually exists within the computer system, as shown in block 33. If the source functional component does not exist within the computer system, the process goes back to block 31 to read another row from the rule table.

Otherwise, if the source functional component does exist within the computer system, a destination functional component is read from a destination functional unit column of the same row, as depicted in block 34. A determination is made as to whether or not the corresponding destination functional component actually exists within the computer system, as shown in block 35. If the destination functional component does not exist within the computer system, the process proceeds to block 37 to read another destination functional component listed in the same row. Otherwise, if the destination functional component does exist within the computer system, then a logical connection is placed between the source functional component object and the destination functional component object within a hardware object model, as depicted in block 36. A determination is then made as to whether or not there is another destination functional component listed in the same row, as shown in block 37. If there is another destination functional component listed in the same row, the process goes back to block 34.

Otherwise, if there is not another destination functional component listed in the same row, another determination is made as to whether there is another row in the rule table, as depicted in block 38. If there is another row in the rule table, the process goes back to block 31 to read another row. Otherwise, the process exits at block 99.

As has been described, the present invention provides an improved method for providing connection information of functional components within a computer system for the purpose of building a hardware object model for the computer system. The rule table of the present invention allows a user the flexibility of including only table files. With the rule table of the present invention, the user is able to make changes to the connections without recompiling the code in order to generate a new hardware object model when there is a change in computer system configuration.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing connection information of functional hardware components within a computer system for the purpose of building a hardware object model for said computer system, said method comprising:

storing a rule table in a non-volatile storage device within said computer system, wherein said rule table describes all possible connections of a plurality of functional hardware components within said computer system;

in response to a change in hardware configuration of said computer system, allowing said rule table to be replaced by a user with a new rule table that reflects said change in hardware configuration;

generating a hardware object model for said computer system during a startup of said computer system, wherein said hardware object model includes a plurality of functional component objects respectively corresponding to said functional hardware components within said computer system; and interrogating said rule table to generate required interconnection information for said functional component objects listed within said hardware object model.

2. The method of claim 1, wherein said rule table includes a source functional unit column containing a list of source functional components within said computer system, and a destination functional unit column containing at least one destination functional component that corresponds to each of said respective source functional components.

3. The method of claim 1, wherein said generating further includes generating said hardware object model by device-level software.

4. The method of claim 2, wherein said interrogating further includes determining whether or not said computer system physically contains one of said source functional components along with its corresponding destination functional component as described by said rule table; and in response to a determination that said computer system physically contains one of said source functional components along with its corresponding destination functional component as described by said rule table, logically connecting a source functional component object to a destination functional component object within said hardware object model, wherein said source functional component object corresponds to said one source functional component, and said destination functional component object corresponds to said destination functional component.

5. A computer storage medium having a computer program product for providing connection information of functional components within a computer system for the purpose of building a hardware object model for said computer system, said computer storage medium comprising:

computer program code for storing a rule table in a non-volatile storage device within said computer system, wherein said rule table describes all possible connections of a plurality of functional hardware components within said computer system;

computer program code for, in response to a change in hardware configuration of said computer system, allowing a user to replace said rule table with a new rule table that reflects said change in hardware configuration;

computer program code for generating a hardware object model for said computer system during a startup of said computer system, wherein said hardware object model includes a plurality of functional component objects respectively corresponding to said functional hardware components within said computer system; and computer program code for interrogating said rule table to generate required interconnection information for said functional component objects listed within said hardware object model.

6. The computer storage medium of claim 5, wherein said rule table includes a source functional unit column containing a list of source functional components within said computer system, and a destination functional unit column containing at least one destination functional component that corresponds to each of said respective source functional components.

7. The computer storage medium of claim 5, wherein said computer program code for generating is device-level software.

8. The computer storage medium of claim 6, wherein said computer program code for interrogating further includes computer program code for determining whether or not said computer system physically contains one of said source functional components along with its corresponding destination functional component as described by said rule table; and computer program code for, in response to a determination that said computer system physically contains one of said source functional components along with its corresponding destination functional component as described by said rule table, logically connecting a source functional component object to a destination functional component object within said hardware object model, wherein said source functional component object corresponds to said one source functional component, and said destination functional component object corresponds to said destination functional component.

9. An apparatus for providing connection information of functional components within a computer system for the purpose of building a hardware object model for the computer system, said apparatus comprising:

a rule table stored in a non-volatile storage device within said computer system, wherein said rule table describes all possible connections of a plurality of functional hardware components within said computer system;

means for, in response to a change in hardware configuration of said computer system, allowing a user to replace said rule table with a new rule table that reflects said change in hardware configuration;

means for generating a hardware object model for said computer system during a startup of said computer system, wherein said hardware object model includes a plurality of functional component objects respectively corresponding to said functional hardware components within said computer system; and means for interrogating said rule table to generate required interconnection information for said functional component objects listed within said hardware object model.

10. The apparatus of claim 9, wherein said rule table includes a source functional unit column containing a list of source functional components within said computer system, and a destination functional unit column containing at least one destination functional component that corresponds to each of said respective source functional components.

11. The apparatus of claim 9, wherein said means for generating said hardware object model is device-level software.

12. The apparatus of claim 10, wherein said means for interrogating further includes means for determining whether or not said computer system physically contains one of said source functional components along with its corresponding destination functional component as described by said rule table; and means for, in response to a determination that said computer system physically contains one of said source functional components along with its corresponding destination functional component as described by said rule table, logically connecting a source functional component object to a destination functional component object within said hardware object model, wherein said source functional component object corresponds to said one source functional component, and said destination functional component object corresponds to said destination functional component.

* * * * *

UNITED STATES PATENT AND TRADEMARK OFFICE
CERTIFICATE OF CORRECTION

PATENT NO. : 7,596,539 B2  Page 1 of 1
APPLICATION NO. : 10/448270
DATED : September 29, 2009
INVENTOR(S) : Chatterjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1888 days.

Signed and Sealed this

Twenty-eighth Day of September, 2010

David J. Kappos
*Director of the United States Patent and Trademark Office*